Patented Mar. 2, 1954

2,671,065

UNITED STATES PATENT OFFICE 2,671,065

POLYVINYL ACETATE DISPERSION AND METHOD OF MAKING UTILIZING POLYACRYLIC ACID AND MONOMER SOLUBLE AND MONOMER INSOLUBLE CATALYST

Erwin W. Ulrich, Rosemount, Minn., assignor to Minnesota Mining & Manufacturing Company, St. Paul, Minn., a corporation of Delaware No Drawing. Application March 30, 1950, Serial No. 152,981

6 Claims. (Cl. 260—29.6)

This invention is concerned with aqueous dispersions of vinyl resins having improved properties, and methods of making the same. One particularly important phase of the invention is concerned with the production of vinyl acetate polymers in stable, concentrated aqueous dispersions from which may be produced adherent dried coatings and films having improved resistance to water. The invention is particularly directed to the production of such dispersions in the presence of a polymer of acrylic acid as the sole protective colloid.

Vinyl acetate is readily polymerized, in the form of dilute aqueous dispersions formed in the presence of acid-stable dispersing agents, by methods well known in the resin art. The preparation of more concentrated dispersions has also been accomplished in the prior art, notably by increasing the proportion of protective colloid or stabilizer. One such type of dispersion contains rather large percentages of hydrolyzed polyvinyl acetate, i. e., polyvinyl alcohol. But this material is water soluble, and hence coatings and films formed from the dispersion are not water-resistant. The presence of large amounts of polyvinyl alcohol also reduces the strength of the adhesive bond of such emulsions to metal. The emulsions have a tendency to thicken or increase in viscosity on prolonged aging. When the amount of such polyvinyl alcohol, or other water-soluble colloid known to the prior art, is decreased so as somewhat to improve the water-resistance and adhesion of the dried film, it is found to be impossible to produce dispersions having a desirably high concentration. Addition of stabilizer-insolubilizing agents to the dispersion ordinarily results in coagulation of the polymer. These various difficulties, up to the date of the present invention, have prevented the production of smooth and stable vinyl acetate polymer emulsions of high concentration which in the form of dried coatings or films were highly water-resistant and adherent.

I have now discovered a method of forming smooth, stable, sprayable, concentrated aqueous emulsions of vinyl acetate polymers whereby the defects and deficiencies of the prior art are avoided. My improved emulsions may contain upwards of 40 percent total solids, and may be dried out to form highly water-resistant or water-insoluble films.

In making my novel emulsions, I employ as the sole stabilizing agent a water-soluble polymer of acrylic acid. This material is water-soluble as prepared but upon forced drying, e. g. heating a pre-dried film for 30 minutes at 105° C., or drying at room temperature for a much longer time, the film becomes insoluble in water and is no longer of value as a stabilizing agent or protective colloid.

The polymerized acrylic acid is dissolved in the water phase, together with suitable activators, emulsifiers or wetting agents, catalysts and the like, and the monomeric vinyl acetate is emulsified in the solution. Polymerization then is induced by increasing the temperature of the mixture. The procedure is similar to that employed with prior art water-soluble stabilizers such as polyvinyl alcohol, starch, gelatin and the like, except for the surprising and unexpected requirement that there be included both a water-soluble and different monomer-soluble catalyst. A single catalyst, commonly a persulfate catalyst, is ordinarily used in the emulsion polymerization of vinyl acetate where polyvinyl alcohol or the like serves as the stabilizing agent. Peroxide-type catalysts are employed in other polymerizations. I have found that single catalysts of either type do not provide effective polymerization of vinyl acetate monomers in the presence of polymerized acrylic acid, but that a combination of the two is highly effective. On the other hand, I have found that this combination of catalysts does not produce stable concentrated emulsions when employed in the presence of conventional stabilizers such as polyvinyl alcohol, starch, alginates, and methyl carboxycellulose.

The effect of the specific catalysts employed, the relative proportions present in the batch, the kind and amount of monomeric material, and other variables will now be described more fully in connection with specific examples, which are presented in explanation but not in limitation of the novel principles involved. In these examples, all parts are given as parts by weight unless otherwise specified.

*Example 1*

| | Parts |
|---|---|
| Water | 46 |
| Polymerized acrylic acid | 4 |
| Vinyl acetate | 50 |
| 30% hydrogen peroxide | 2 |
| Ammonium persulfate | 0.25 |

One-half of this vinyl acetate, and all of the remaining ingredients were mixed together to form an emulsion, and ammonium hydroxide was added to bring the pH to approximately 4.0. The batch was heated at 50–60° C. for several hours with continued mixing. The remainder of the monomer was then added, and heating and mixing continued for several hours. The temperature was then gradually raised to 90° C., after which the batch was allowed to cool to room temperature. The finished emulsion had a viscosity of 350 centipoise at 25° C., contained 48.4 percent total solids, and had a pH of 3.6. A sample remained smooth and sprayable for several years when stored in a sealed glass container at normal room temperatures.

The polymerized acrylic acid used in the above as well as in the following examples is a low-viscosity polymer which is soluble in water. Such a material may be prepared as follows:

| | Parts |
|---|---|
| Water | 151 |
| Acrylic acid | 7.6 |
| Potassium persulfate | 0.3 |

Heat the mixture at 60° C. for two hours with continuous agitation under an atmosphere of nitrogen, i. e. in the absence of oxygen. The product at 5% solids and 25° C. has a viscosity of between 25 and 40 centipoises.

The polymer may be used as formed, or may be recovered from solution by drying in thin films at not higher than 50° C., in which case it is readily redispersible in water. If the air-dry polymer is further dried for 30 minutes at 105° C., or for a week or more at about 50° C., it will not readily redisperse in water and is no longer of value as an emulsion stabilizer.

In another preparation, the polymer was formed from 20 parts of acrylic acid in a mixture of 40 parts of ethyl alcohol and 40 parts of water, using 0.1 part of benzoyl peroxide as the catalyst, and polymerizing at 50° C. The resulting solution had a viscosity at 25° C. of 1620 centipoises.

*Example 2*

| | Parts |
|---|---|
| Water | 44 |
| Polymerized acrylic acid | 1.3 |
| Vinyl acetate | 54 |
| Wetting agent | 0.05 |
| Potassium persulfate | 0.09 |
| Hydrogen peroxide (as 30% solution) | 0.27 |
| Sodium bisulfite | 0.02 |

One-third of the vinyl acetate was mixed with the water solution of the remaining ingredients at 25° C., and the acidity was adjusted to a pH of 4.0 with sodium hydroxide. The batch was heated under a nitrogen atmosphere for 2 hours at 62° C. Another one-third of the vinyl acetate was added, and heating continued for 2 hours with the temperature being gradually increased to 72° C. The batch was cooled to 62° C. and the balance of the monomer added, and reaction completed at 75–80° C. When cooled at 25° C., the completed emulsion had a pH of 3.5, a solids analysis (by drying at 105° C.) of 54–55%, and a viscosity of between 2500 and 7500 centipoises. Samples of such emulsions in storage for several years have remained smooth and stable. The emulsion dries rapidly without skinning over, due to its low stabilizer content, and yields clear water-white films which are quite hard.

When dried at room temperature just to transparency, i. e. to substantially complete elimination of water, the thin film may be soaked in water and rubbed between thumb and forefinger without losing its shape and reverting to emulsion form; i. e., the film is water-insoluble. Drying for 30 minutes at 105° C. renders the film still more water-resistant and reduces the extent to which it will soften in water.

On the other hand, typical concentrated polyvinyl acetate emulsions containing polyvinyl alcohol as the sole stabilizing agent form air-dried films which soften and break up when soaked in water, and which may readily be reconverted to emulsion form by gentle rubbing in the presence of water. Such films are water-soluble or water-dispersible, in contrast to the water-insoluble or non-dispersible films of my novel emulsions.

The wetting agent employed in Example 2 serves desirably to decrease the particle size of the emulsion and somewhat increases the viscosity and uniformity. Dioctyl sodium sulfosuccinate ("Aerosol OT"), alkyl sulfates such as "Duponol ME," and alkyl aryl sulfonates such as "Nacconol NRSF" are all useful in this connection.

Sodium bisulfite, included in Example 2 but not in Example 1, is an example of an activator which speeds up the reaction induced by the catalysts.

In Example 2, sodium hydroxide was used instead of ammonium hydroxide to adjust the acidity, and potassium persulfate catalyst replaced the ammonium persulfate of Example 1. I have observed that the presence of ammonium ions in my compositions results in a noticeable yellowing of dried films of the polymer, which is avoided in the present formula.

*Example 3*

| | Parts |
|---|---|
| Water | 39 |
| Polymerized acrylic acid | 0.78 |
| Vinyl acetate | 56.5 |
| "Aerosol OT" | 0.035 |
| Potassium persulfate | 0.078 |
| Hydrogen peroxide (as 30% solution) | 0.23 |
| Sodium bisulfite | 0.02 |

The vinyl acetate was added in three equal parts and the polymerization carried out as in Example 2, initial pH being adjusted to just above 4.0. The emulsion had a final pH of 3.6, a viscosity of 1000–1200 cps., and a solids analysis of 57–58%. Dried films were slightly hazy, smooth, glossy, hard and tough.

*Example 4*

| | Parts |
|---|---|
| Water | 41.3 |
| Polymerized acrylic acid | 1.66 |
| Vinyl acetate | 43.4 |
| Di-isoamyl ethylene glycol dimaleate | 0.43 |
| "Aerosol OT" | 0.04 |
| Potassium persulfate | 0.08 |
| Hydrogen peroxide (as 30% solution) | 0.25 |
| Sodium bisulfite | 0.02 |

The di-isoamyl ethylene glycol dimaleate cross-linking agent was prepared by esterifying one mol of ethylene glycol with two mols of maleic anhydride in the presence of para-toluene sulfonic acid as catalyst, and then further esterifying with amyl alcohol (fusel oil) present in excess. It was blended with the vinyl acetate monomer, which was added to the aqueous solution in two equal parts. The initial pH was adjusted to 4.0; the final pH was 3.5. Dried films of this emulsion were clear and water white, hard and tough, and showed improved heat and solvent resistance as compared with those of Examples 2 and 3.

The cross-linked polymer emulsion was slightly grainy and not quite as smooth as those of the previous examples.

*Example 5*

| | Parts |
|---|---|
| Water | 41.2 |
| Polymerized acrylic acid | 0.8 |
| Vinyl acetate | 34.8 |
| Triethylene glycol phthalate | 8.7 |
| "Aerosol OT" | 0.04 |
| Potassium persulfate | 0.08 |
| Hydrogen peroxide (as 30% solution) | 0.25 |
| Sodium bisulfite | 0.02 |

The triethylene glycol phthalate was a viscous, balsam-like alkyl resin plasticizer. It was mixed with the vinyl acetate, which was then added in two equal parts. The emulsion produced films which were quite flexible and elastic, although somewhat less clear than those of unplasticized polymers. The reaction rate was reduced, the particle size increased, and the viscosity of the emulsion increased to about 15000–16000 cps. by the presence of the plasticizer.

The plasticizer may equally well be added to a preformed emulsion. Likewise, other plasticizers, fillers and pigments, asbestos fibers, additional stabilizers, etc. may be blended with the stable emulsions of this invention.

*Example 6*

| | Parts |
|---|---|
| Water | 42.3 |
| Polymerized acrylic acid | 1.3 |
| Vinyl acetate | 34.7 |
| Ethyl acrylate | 8.7 |
| Wetting agent | 0.04 |
| Potassium persulfate | 0.08 |
| Hydrogen peroxide (as 30% solution) | 0.25 |
| Sodium bisulfite | 0.02 |

The vinyl acetate and ethyl acrylate monomers were mixed and added in two equal parts for polymerization. The emulsion has a viscosity of 1600–1800 cps., the monomer being 95–97% converted to polymer. Dried films were flexible and non-tacky, and were colorless but very slightly cloudy.

A similar polymer containing 30% of ethyl acrylate in place of the 20% of the above example was still softer and slightly tacky or sticky.

These co-polymer emulsions were stable for more than one year, but not as long as the unmodified vinyl acetate polymer emulsions.

*Example 7*

Another copolymer was prepared from a mixture of 27.9 parts of vinyl acetate and 14.9 parts of di-(2-ethoxyethyl) maleate, added to the aqueous solution in two equal parts as in Example 6.

The emulsion was stable in excess of one year. The average size of the dispersed copolymer particles was less than about 0.3 micron, although a few particles were observed which had a diameter of about 3–4 microns. Films obtained on drying the emulsion were tough and flexible.

*Example 8*

| | Parts |
|---|---|
| Water | 32 |
| Polymerized acrylic acid | 0.94 |
| Vinyl acetate | 43.5 |
| Wetting agent | 0.03 |
| Activator | 0.02 |
| Potassium persulfate | 0.06 |
| Hydrogen peroxide (as 30% solution) | 0.06 |

The vinyl acetate was added in three equal parts. The reaction was extremely vigorous, and in any but the smallest laboratory-size reactor vessel was almost uncontrollable. Particle size of the emulsion was relatively large. Dried films were grainy and cloudy. This formula represents approximately the upper useful limit of the persulfate:peroxide ratio.

*Example 9*

| | Parts |
|---|---|
| Water | 31.2 |
| Polymerized acrylic acid | 0.94 |
| Vinyl acetate | 29.0 |
| Wetting agent | 0.03 |
| Activator | 0.02 |
| Potassium persulfate | 0.03 |
| Hydrogen peroxide (as 30% solution) | 0.19 |

The vinyl acetate was added in two equal parts. Reaction was sluggish, and heating had to be continued for an unusually long time. Particle size was large, but the dried films were exceptionally clear and transparent.

Doubling the amount of each catalyst effectively increased the rate of reaction.

*Example 10*

| | | |
|---|---|---|
| Water | grams | 400 |
| 16% solution of polymerized acrylic acid in water | | 100 |
| 10% solution of "Aerosol OT" in water | | 5 |
| Potassium persulfate | | 1 |
| 30% hydrogen peroxide | | 10 |
| Sodium bisulfite | | 0.25 |
| Vinyl propionate | | 200 |
| 10% sodium hydroxide solution | cc | 8 |
| Vinyl propionate | grams | 200 |
| Potassium persulfate | | 0.5 |
| 30% hydrogen peroxide | | 5 |

In this laboratory-size preparation the ingredients were added to the flask in the order named. The initial pH of the batch was 2.45; after addition of the sodium hydroxide solution, the pH was 3.8. Induction was accomplished at 62° C., the reaction being completed at up to 70° C. The reaction was extremely slow, and additional quantities of catalyst were therefore added after the second addition of monomer. The solids analysis was 44.0%, indicating a percent polymerization of 96.7%. The final pH was 3.45, and the viscosity 145 centipoise at 25° C.

The above example shows that vinyl esters of short-chain organic acids other than acetic acid may similarly be polymerized in the form of concentrated smooth aqueous emulsions in accordance with the principles of my invention, and such polymers are considered as being fully equivalent to the vinyl acetate polymers herein specifically claimed.

In these formulas, the potassium persulfate serves as an example of a water-soluble catalyst. This material is not soluble in vinyl acetate monomer. The hydrogen peroxide is water-soluble; but it is also soluble in vinyl acetate, and hence serves as another catalyst, soluble in the monomer, as called for in the claims. Benzoyl peroxide, also soluble in vinyl acetate, is insoluble in the water phase; it, as well as acetyl peroxide, has effectively replaced hydrogen peroxide in approximately equal proportions by weight in carrying out the reactions indicated herein.

The ratio of the two catalysts should lie within the approximate limits shown in the examples.

In terms of specific components there described, the ratio of potassium persulfate to hydrogen peroxide should lie within the approximate limits of 1/1 to 1/10. This ratio may vary where other water-soluble and monomer-soluble catalysts having substantially different equivalent weights are employed.

The total amount of catalysts is conveniently expressed in terms of percentage based on the water content, and will be seen to come within the approximate limits of one-half to five percent. Too large an amount of either catalyst produces cloudy films. Excess catalyst is to be avoided because of the additional expense involved, but within the above proportions it is found that the reaction proceeds readily and economically.

Ordinarily, the pH of the mixture before polymerization, and with about one-third to one-half of the monomer present, should be adjusted to come within about 3.5–4.5, and preferably should be approximately 4.0. A higher initial pH results in large particle size, grainy emulsions, whereas a lower pH produces much smaller particle size and a lower rate of polymerization (or lower degree of conversion of monomer to polymer). For example, two batches containing 41 parts of water, 1.29 parts of polymerized acrylic acid, and 44 parts of vinyl acetate, and with a 3:1 ratio of peroxide:persulfate were adjusted to different initial pH values by addition of sodium hydroxide. At pH 3.5, the resulting emulsion had a very small particle size. The solids content on analysis indicated a conversion of monomer to polymer of only 89%. Dried films were clear and water-white, hard and tough. At an initial pH of 5.5, the reaction was 96–98% completed, but the dried films were harder, considerably more brittle, and cloudy. Below a pH value of about 3.0, an unstable emulsion is obtained.

From about one to about 2.5 percent of polymerized acrylic acid based on the total weight of emulsion has been found to produce the best results where the calculated solids content is 40–60 percent, although amounts of from somewhat less than one percent up to about five percent have been found useful. The dried films of these emulsions will thus be seen to contain approximately 1–10 percent of polymerized acrylic acid, or, in the preferred range, approximately 2–5 percent. The higher values result in increased viscosity and smaller particle size, whereas reduced amounts of polymerized acrylic acid result in large particle size emulsions which are less stable, i. e. from which the vinyl acetate polymer coagulates or settles out.

Strong agitation is required throughout the polymerization in order to insure adequate mixing of the components. Particle size of the order of 0.2–0.3 micron is ordinarily obtained.

The polymerization reaction will ordinarily take place when the system is heated to 45° C. or above; as indicated in the examples, a temperature of about 60° C. is preferred. The temperature is allowed to rise as the reaction proceeds, but excessive boiling is to be avoided.

My novel high-solids-content vinyl acetate polymer emulsions differ from the high-solids-content emulsions of the prior art in forming dried films which are highly water-resistant after brief heating, e. g. for 30 minutes at 105° C. The polymerized acrylic acid, which as previously indicated itself forms a water-insoluble film under such conditions, appears to reinforce the vinyl acetate polymer film, which then retains its shape when soaked and stirred in water. Resistance to organic solvents, e. g. alcohol, is also increased. Indeed, this characteristic insolubility of the heated films of my novel product serves as a principal means of identifying the same.

Another important characteristic property of my novel emulsions, lacking in the high-solids-content emulsions of the prior art, is their greatly increased adhesion to various surfaces when coated and force-dried thereon. Their adhesion to aluminum foil and to regenerated cellulose film (cellophane) is particularly outstanding. Apparently the free carboxyl groups of the polymerized acrylic acid in some way increase the bond of the film to the surface of such materials, an effect which is totally lacking where polyvinyl alcohol or the like is used as the stabilizing agent.

In addition to these special properties of the emulsion, the products of my invention may be distinguished by their content of polymerized acrylic acid in the aqueous phase. Thus, freezing of the emulsion and removal of the vinyl acetate polymer by filtration or with the centrifuge leaves a solution in which the presence of polymerized acrylic acid may readily be detected. The addition of an alkali, such as sodium hydroxide, to the emulsion causes an increase in viscosity, whereas with conventional emulsions stabilized with polyvinyl alcohol, the addition of alkali causes a reduction in viscosity.

Having described various embodiments of my invention for purposes of illustration, but without intent to be limited thereto, what I claim is as follows:

1. The method of making a smooth, stable, sprayable aqueous emulsion of a vinyl polymer of monomers including at least a predominant proportion of a vinyl ester of a short-chain fatty acid having 2–3 carbon atoms capable of forming a water-insoluble film as herein described when dried in thin film form at normal room temperatures, said method comprising heating at a temperature above about 45° C. and below the boiling point, a dispersion of 100 parts by weight of vinyl acetate monomer in an aqueous solution of solutes comprising about 2–5 parts of polymerized acrylic acid, said dispersion being adjusted to a pH of at least about 3.5 and not higher than about 4.5 and containing polymerization catalysts comprising a peroxide catalyst soluble in said monomer and a water-soluble persulfate catalyst which is insoluble in said monomer, in a ratio within the range of about 1:1 to about 10:1.

2. The method of making a smooth, stable, sprayable aqueous emulsion of vinyl acetate polymer capable of forming a water-insoluble film as herein described when dried in thin film form at normal room temperatures, said method comprising heating, at a temperature ranging between about 50° C. and about 90° C., a dispersion of vinyl acetate monomer in an aqueous solution of solutes comprising polymerized acrylic acid, said acid being in an amount by weight within the range of about 1–10 percent of the weight of said monomer, said dispersion being adjusted to a pH of at least about 3.5 and not higher than about 4.5 and containing polymerization catalysts comprising a peroxide catalyst soluble in said monomer and a water-soluble persulfate catalyst which is insoluble in said monomer, in a ratio within the range of about 1:1 to about 10:1.

3. The method of making a smooth, stable, sprayable, concentrated aqueous emulsion of vinyl acetate polymer capable of forming a water-insoluble film as herein described when dried in thin film form at normal room temperatures, said method comprising: dispersing vinyl acetate monomer in an aqueous solution of solutes comprising polymerized acrylic acid and containing polymerization catalysts comprising a peroxide catalyst soluble in said monomer and a water-soluble persulfate catalyst which is insoluble in said monomer, the ratio of said peroxide to said persulfate being within the range of about 1:1 to about 10:1; adjusting the pH to at least about 3.5 and not higher than about 4.5; heating the dispersion to at least about 45° C. to start the polymerization reaction; and adding further amounts of monomer and maintaining the temperature of the dispersion at not higher than reflux temperature until the total solids content of the dispersion is at least about 40%, the weight of the polymerized acrylic acid is about 1-10% of the total solids, and the monomer is substantially completely polymerized.

4. A smooth, stable, sprayable aqueous emulsion of vinyl ester polymer capable of forming a water-insoluble film as herein described when dried in thin film form at normal room temperatures, prepared in accordance with the method of claim 1.

5. A smooth, stable, sprayable aqueous emulsion of vinyl acetate polymer capable of forming a water-insoluble film as herein described when dried in thin film form at normal room temperatures, prepared in accordance with the method of claim 2.

6. A smooth, stable, sprayable concentrated aqueous emulsion of vinyl acetate polymer having a total solids content of at least about 40% and capable of forming a water-insoluble film as herein described when dried in thin film form at normal room temperatures, prepared in accordance with the method of claim 3.

ERWIN W. ULRICH.

References Cited in the file of this patent

UNITED STATES PATENTS

| Number | Name | Date |
|---|---|---|
| 1,586,803 | Herrmann et al. | June 1, 1926 |
| 1,976,679 | Fikentscher et al. | Oct. 9, 1934 |
| 2,133,257 | Strain | Oct. 11, 1938 |
| 2,462,354 | Brubaker | Feb. 22, 1949 |
| 2,565,783 | Schouteden et al. | Aug. 28, 1951 |

FOREIGN PATENTS

| Number | Country | Date |
|---|---|---|
| 437,446 | Great Britain | Oct. 28, 1935 |
| 615,219 | Germany | June 29, 1935 |
| 906,863 | France | Feb. 22, 1946 |